United States Patent
Lin et al.

(10) Patent No.: US 9,789,557 B2
(45) Date of Patent: Oct. 17, 2017

(54) ELECTROSPARK DEPOSITION PROCESS FOR OXIDATION RESISTANT COATING OF COOLING HOLE

(71) Applicant: GENERAL ELECTRIC COMPANY, Schenectady, NY (US)

(72) Inventors: Dechao Lin, Greer, SC (US); Ibrahim Ucok, Simpsonville, SC (US); Kivilcim Onal, Greer, SC (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 14/816,527

(22) Filed: Aug. 3, 2015

(65) Prior Publication Data
US 2016/0031033 A1    Feb. 4, 2016

Related U.S. Application Data

(62) Division of application No. 13/585,382, filed on Aug. 14, 2012, now abandoned.

(51) Int. Cl.
*B23K 9/04*    (2006.01)
*C23C 26/02*   (2006.01)
(Continued)

(52) U.S. Cl.
CPC ............... *B23K 9/04* (2013.01); *C23C 26/02* (2013.01); *F01D 5/185* (2013.01); *F01D 9/023* (2013.01);
(Continued)

(58) Field of Classification Search
None
See application file for complete search history.

(56) References Cited

U.S. PATENT DOCUMENTS 3,752,606 A    8/1973    Walsh et al.
4,321,311 A    3/1982    Strangman
(Continued)

OTHER PUBLICATIONS

Norma Price, Results of materials testing for ElectroSpark Deposition, available online at: http://www.asetsdefense.org/documents/Workshops/ReplacementofHardChromeandCadmiumPlating06/50.%20Price%20Electrospark%20Deposition.pdf, dated Jan. 2006; 42 pages.

(Continued)

*Primary Examiner* — Joel Horning
(74) *Attorney, Agent, or Firm* — McNees Wallace & Nurick LLC

(57) ABSTRACT

A method of providing an oxidation resistant coating is disclosed. The method includes providing a substrate having a first surface and cooling holes. A portable coating device includes electro-spark deposition (ESD) equipment and an ESD torch connected with the ESD equipment. The ESD torch has an inert gas source and a rotary electrode conductive material. The rotary electrode is positioned within the ESD torch, and is shielded by an inert gas. The rotary electrode applies a compositionally controlled protective coating to the first surface of the substrate. Then the rotary electrode is inserted into the cooling hole and generates an electrospark between rotary ESD electrode and the substrate to form a rounded edge and deposit a coating of electrode material alloy at a cooling hole edge.

10 Claims, 4 Drawing Sheets

(51) Int. Cl.
*F01D 5/18* (2006.01)
*F01D 9/02* (2006.01)

(52) U.S. Cl.
CPC .... *F05D 2230/90* (2013.01); *F05D 2260/202* (2013.01); *Y10T 428/12361* (2015.01)

(56) References Cited

U.S. PATENT DOCUMENTS

| | | |
|---|---|---|
| 6,417,477 B1 | 7/2002 | Brown et al. |
| 2008/0085395 A1* | 4/2008 | Fernihough ............ F01D 5/005 428/131 |
| 2009/0056096 A1 | 3/2009 | Hixson et al. |
| 2012/0128893 A1* | 5/2012 | Furukawa ............... C23C 26/00 427/540 |

OTHER PUBLICATIONS

Denise M. Aylor, Electrospark deposition for U.S. Navy component repair applications. available online at https://www.corrdefense.org/Academia%20Government%20and%20Industry/06T092.pdf; accessed Aug. 2012; 17 pages.
M. J. Lambert, Summary of Dissimilar Metal Joining Trials Conducted by Edison Welding Institute, available online at http://www.osti.gov/bridge/servlets/purl/884671-xNhBPV/884671.pdf; Nov. 2005; 78 pages.
ElectroSpark Deposition studies for gas turbine engine component repair. Available online at http://www.asetsdefense.org/documents/Workshops/24thCadmiumPlatingMeeting/33.%20Price%20HCAT%20July%202004%20Utah.pdf; Jul. 2004; 42 pages.
Plasma Jet S.L.R, Electro-Spark Deposition (ESD) process, available online at http://www.plasmajet.ro/en/content/electro-spark-deposition; accessed Aug. 2012; 4 pages.
J. Gould, Application of Electro-Spark Deposition as a Joining Technology, Welding Journal, vol. 90, Issue Oct. 2011, pp. 191s-197s.
Shoju Aoshima, Electro-spark Process for Repair and Maintenance of Die-Casting Dies. Available online at http://www.murata.com.tr/brosurler/ESP%20Repair%20and%20Maintenance%20of%20DieCast.pdf; accessed Aug. 2012; 8 pages.

* cited by examiner

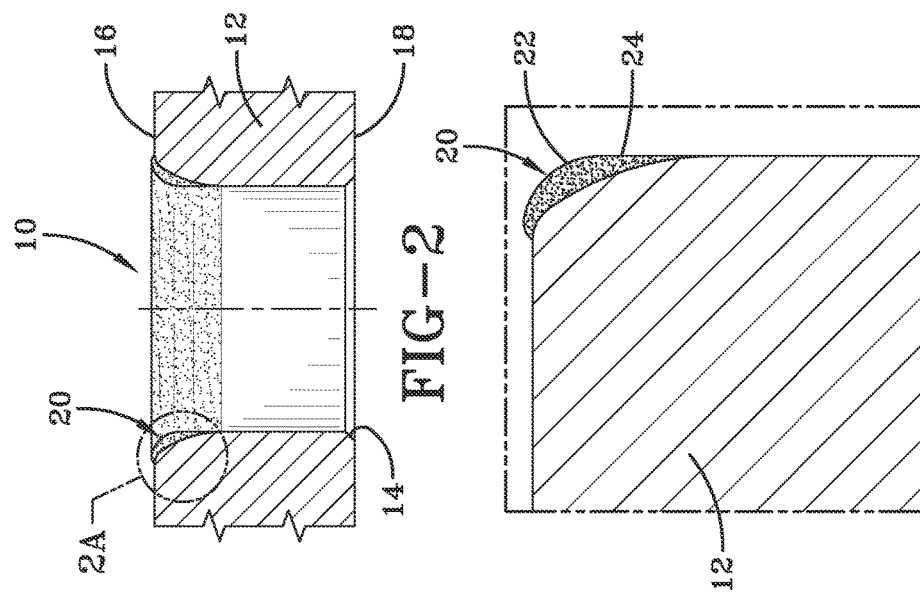
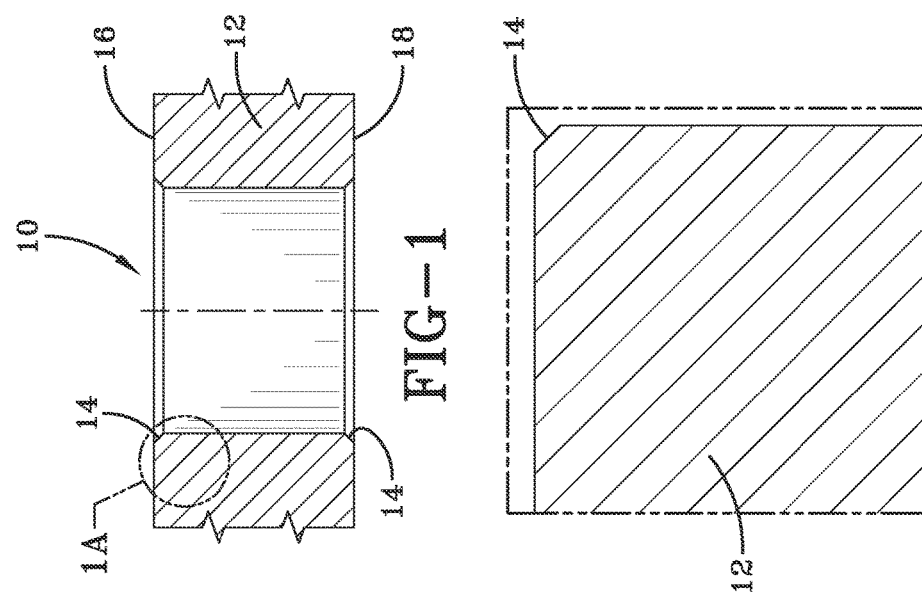

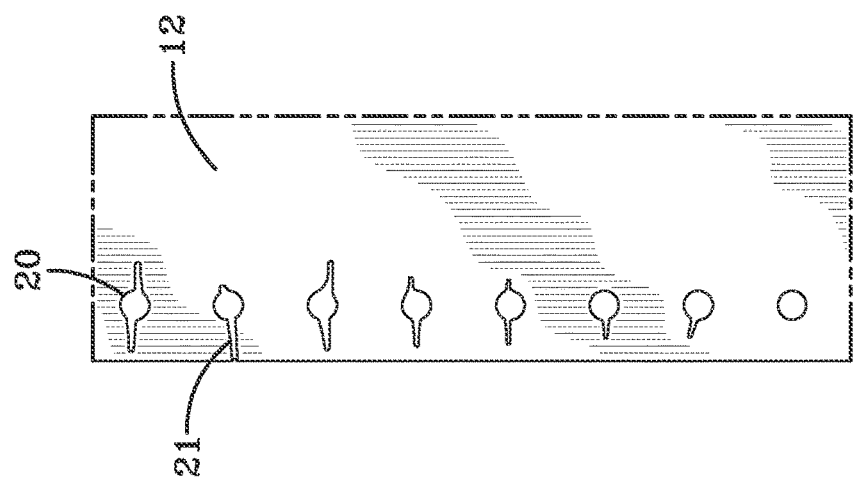
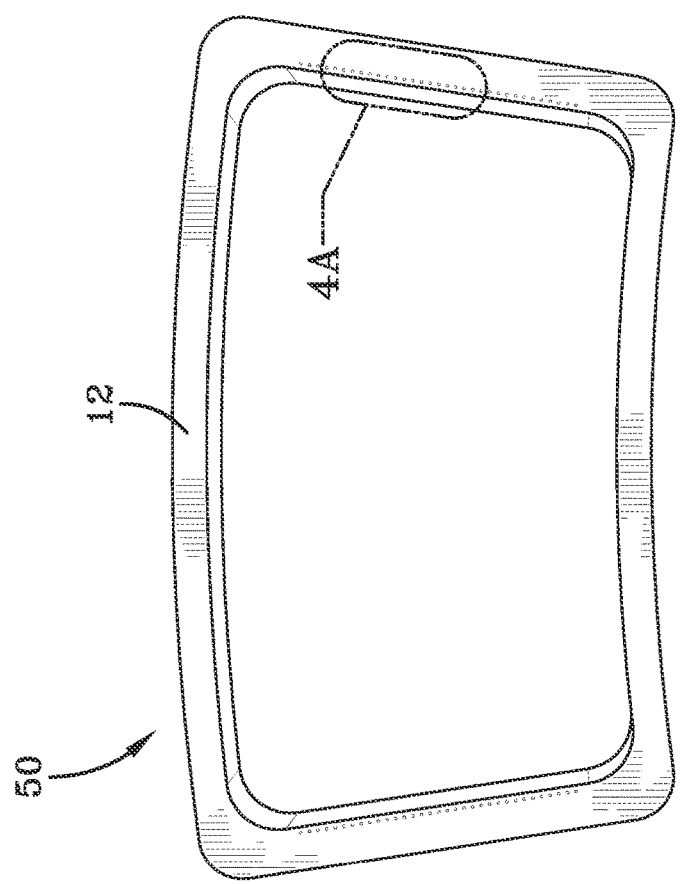

ELECTROSPARK DEPOSITION PROCESS FOR OXIDATION RESISTANT COATING OF COOLING HOLE

FIELD OF THE INVENTION

This application generally relates to gas turbine components. The application relates more specifically to the use of an electrospark deposition process to apply an oxidation resistant coating to a cooling hole of a gas turbine component.

BACKGROUND OF THE INVENTION

Many component parts of a gas turbine engine include cooling holes for active cooling of engine sections located downstream of the turbine section. The rising combustor exit temperatures in gas turbine engines necessitate active cooling to avoid thermal failure. For example, a transition piece for a gas turbine engine typically includes an integral frame portion surrounding an opening at a downstream end where the transition piece connects to the turbine stage. An exemplary transition piece is described in U.S. Pat. No. 5,414,999.

Under the high temperature operating conditions of the gas turbine engine, fracture or cracks may occur around the cooling holes located on portions of the frame. Failure analysis has revealed that such cracks form perpendicular to the inner surface of the frame, which indicates that thermal stresses played a role in forming the cracks occurring at the cooling hole. Grain boundary oxidation and thermal fatigue are potential causes of such cracking. Cracks initiated at the cooling holes on the aft-facing end of the frame and propagated into the body of the frame. Analysis indicated that cracks in the cooling holes of the frame followed the oxidized grain boundaries. Currently there is no process to prevent crack initiation at the aft end of the cooling holes.

There is a need for local reinforcement of cooling holes in a gas turbine component. There is also a need to provide enhanced oxidation resistance around the cooling holes to reduce oxidation and cracking along grain boundaries.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

BRIEF DESCRIPTION OF THE INVENTION

One embodiment the disclosure relates to a method of providing an oxidation resistant coating. The method includes providing a substrate having a first surface and at least one cooling hole; providing a portable coating device including: electro-spark deposition (ESD) equipment, and an ESD torch electrically connected with the ESD equipment; the ESD torch including: an inert gas source; and a rotary electrode including a conductive material, the rotary electrode disposed within the ESD torch, the rotary electrode shielded by an inert gas; and the rotary electrode applies a compositionally controlled protective coating to the first surface of the substrate; then, inserting the rotary electrode at least partially into the cooling hole; generating an electrospark between rotary ESD electrode and the substrate to form a rounded edge and deposit a coating of electrode material alloy at a cooling hole edge.

Another embodiment relates to a system for depositing an oxidation resistant coating on a cooling hole edge in a substrate. The system includes an electrospark device and an electrode removably supported in the electrode holder. The electrospark device is configured to apply a coating of a material when inserted into a cooling hole in the substrate and placed into contact with the metal substrate. A rotary electrode is disposed within the ESD torch. The rotary electrode is shielded by an inert gas. The rotary electrode applies a compositionally controlled protective coating to the substrate at an edge of the cooling hole in response to an electrospark generated by an electrical current through the rotary electrode.

The present disclosure includes a method to enhance the oxidation resistance of the cooling hole exit locally by applying an ESD process with the electrode having an appropriate tip profile. The ESD process establishes an electrospark between the rotary electrode and the hole exit. Heat from the electrospark deposition softens and deforms the upper corner of the cooling hole to form a rounded edge with an alloy coating that provides improved resistance to oxidation of the substrate metal.

An advantage of the disclosed method is a reduction in the number of turbine components discarded or scrapped.

Another aspect is the ability to heat and deform the top corners of a cooling hole to a rounded shape using ESD.

Still another aspect of the disclosure is the ability to build up an ESD coating layer having a superior resistance to oxidation of the metal substrate.

Alternative exemplary embodiments relate to other features and combinations of features as may be generally recited in the claims.

BRIEF DESCRIPTION OF THE DRAWINGS

FIG. 1 shows a cross-sectional view of a prior art cooling hole.

FIG. 1A shows an enlarged sectional view of an edge of the cooling hole of FIG. 1.

FIG. 2 shows a cross-sectional view of a rounded, oxidation resistant cooling hole formed with the ESD process.

FIG. 2A is an enlarged section view of the rounded corner of FIG. 2.

FIG. 4 shows a transition piece aft frame portion of a gas turbine engine.

FIG. 4A shows an enlarged view of section 4A in FIG. 4 showing cracking around cooling holes in the transition frame portion.

DETAILED DESCRIPTION OF THE INVENTION

Figure 3:
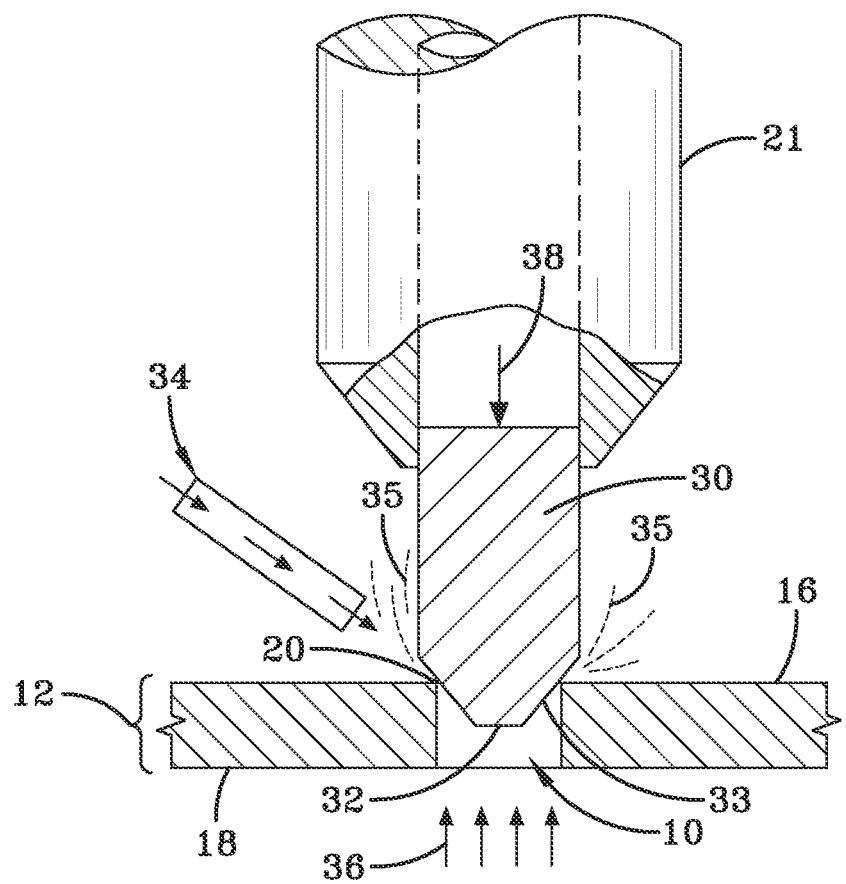
FIG. 3 shows a schematic arrangement for performing the ESD process on a cooling hole.

Referring to FIG. 1 and FIG. 1a are a cross-sectional view of a prior art cooling hole is shown. A cooling hole 10 passes through a metal frame substrate 12. An edge 14 of the cooling hole 10 appears at each of the top surface 16 or the bottom surface 18 of metal frame substrate 12. Cooling hole 10 is formed in metal frame substrate 12 to provide air flow therethrough for cooling metal substrate 12 in harsh, high temperature environments, e.g., in a gas turbine engine transition piece (not shown). Edges 14 are subject to oxidation when exposed to harsh, high temperature environments such as are present in a gas turbine engine. The oxidized substrate material adjacent to cooling holes 10 results in cracks forming in metal substrate 12 around cooling holes 10. In particular, at the aft-facing side end of metal substrate 12 cracks are prone to form.

Referring next to FIGS. 2 and 2A, a cooling hole 10 is shown which has been treated by the ESD coating process described in greater detail below. Metal frame substrate 12 has a rounded edge 20 with an oxidation resistant coating 22 adjacent top surface 16 from applying the ESD coating process. Edge 14 on bottom surface 18 has not been exposed to the ESD coating process, and as a result edge 14 remains a sharp corner configuration without a rounded, coated edge. In one embodiment, oxidation resistant coating 22 may be about 2 mils thick over substantially the entire surface 24 of rounded edge 20. The coating thickness may vary more or less depending on the particular geometry of the cooling holes, e.g., in some embodiments the coating thickness may be as thick as 3 mils.

Referring next to FIG. 3, an exemplary arrangement for rounding and coating edge 20 in cooling hole 10 is shown. An ESD torch 21 is electrically connected to the ESD equipment by an electrical connection (not shown). Electrical current allows the ESD torch 21 to generate a spark to melt a portion of a rotary electrode 30. The ESD torch 21 is used to apply a compositionally controlled protective coating 22 to the substrate 12 at an edge of cooling hole 10. In one embodiment, the ESD torch 21 and associated equipment includes a conventional ESD power source, which incorporates either a series of capacitors or a silicon controlled rectifier coupled with isolated gate bipolar transistor switches. The deposition rate for the ESD torch 21 varies depending on the application speed determined by the user.

The rotary electrode 30 having a partially tapered tip portion 32 is inserted at least partially into cooling hole 10 through metal frame substrate 12 adjacent top side 16. In one embodiment tip portion 32 includes a transition portion 33 transitioning from the diameter of rotary electrode 30. The diameter of rotary electrode 30 is slightly larger than the diameter of cooling hole 10, while a smaller diameter tip portion 32 is less than the diameter of cooling hole 10, to permit partial insertion of tip portion 32 into cooling hole 10. In other embodiments the shape of tip portion 32 may have a geometry tailored for forming a predetermined geometry of the cooling hole exit, for example, a rounded edge. The substrate 12 may be, e.g., a piece of combustion hardware, e.g., a transition piece aft picture frame 15 (also see FIG. 4). The edge of the transition piece aft picture frame 15 of the turbine engine includes a plurality of cooling holes 20 (see FIG. 4).

Figure 6:
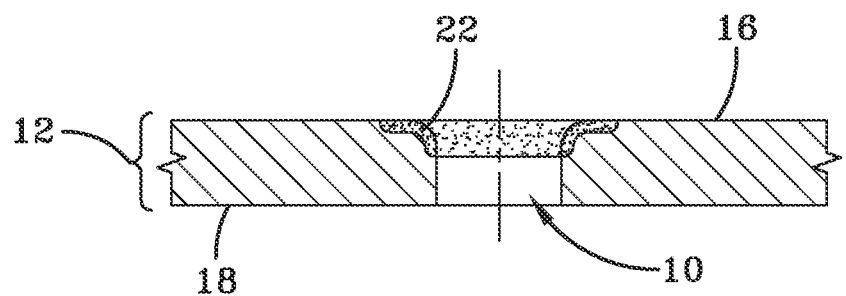
FIG. 6 shows a rounded, coated cooling hole exit with oxidation-resistant coating.

A first shielding gas flow 34 is directed at tip portion 32 to provide an inert gas curtain around the deposition site at edge 20. A second shielding gas flow 36 may also be directed at tip portion 32 through cooling hole 10 from bottom surface 18. Shielding gas is well known to those skilled in weld process, such as electrospark deposition, and prevents oxygen and other gases from contaminating the metal deposition site. When ESD electrode 30 is energized an electrospark is generated between rotary ESD electrode 30 and top surface 16 at edge 20. The electrospark generates sufficiently high temperature to cause rotary electrode 30 to melt a portion of edge 20 forming a generally rounded edge 20, and to deposit a coating 22 (see, e.g., FIG. 6) of electrode material alloy at cooling hole 10 adjacent surface 16 of metal substrate 12. As indicated by arrow 38, a force may be applied to rotary electrode 30 to press the electrode tip 32 into contact with substrate 12 in cooling hole 10.

Coating 22 enhances the resistance to oxidation locally around cooling hole 10. In one embodiment, coating 22 may be deposited on the top side, e.g., at the aft end, to enhance the resistance to oxidation. Further, by using the ESD in one the top side 16 only, the rounded hole formed thereby reduces the concentration of stress that would otherwise be present at a sharp corner of the cooling hole 10.

In one embodiment, ESD electrode 30 is pressed forcibly on the cooling hole 10 under shielding gas 34. An electrospark 35 is established between rotary electrode 30 and cooling hole 10 of metal frame substrate 12. The electrospark generates local heating and forging of metal frame substrate 12 and rotary electrode 30. An ESD coating is built up on the exit of cooling hole 10. The exit geometry of cooling hole 10 is tailored by the tapered electrode shape. The selection of electrode depends on the application. Any superior oxidation resistant material can be used as an ESD electrode The electrode may be, e.g., a sintered metal alloy powder such as CoNiCrAlY, although any oxidation-resistant MCrAlY system or superalloy composition may be used to make the coating build up on the hole exit.

Figure 5:
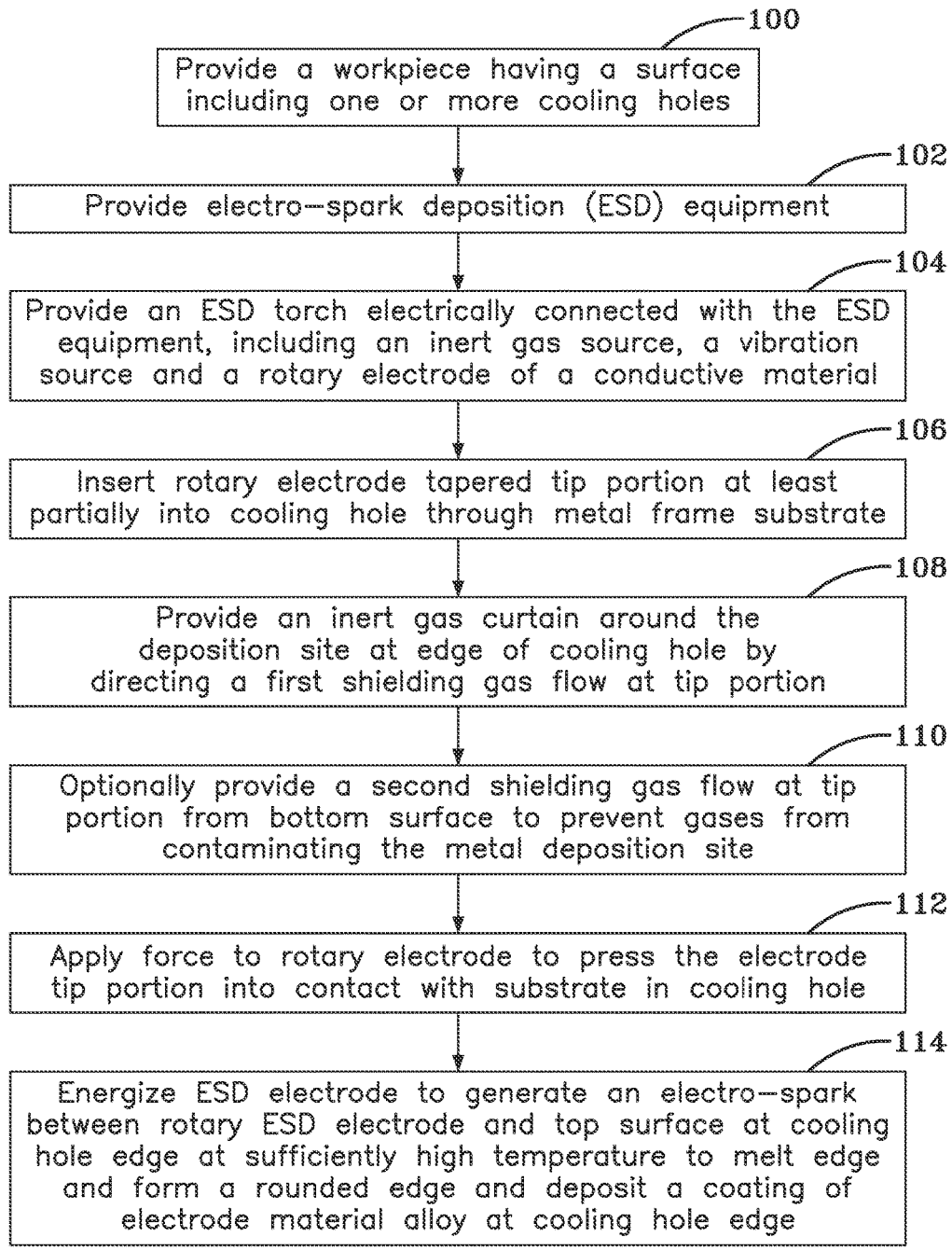
FIG. 5 shows a flow chart of the method of enhancing oxidation resistance of cooling holes on combustion components of a gas turbine engine.

Referring next to FIG. 5, a flow chart is provided to describe the method of the present disclosure. At step 100, the method begins by providing a workpiece having a surface including one or more cooling holes. The method proceeds to step 102 providing electro-spark deposition (ESD) equipment, and at step 104, providing an ESD torch electrically connected with the ESD equipment, including an inert gas source and a rotary electrode 30 of a conductive material. At step 106, rotary electrode tapered tip portion 32 is then inserted at least partially into cooling hole 10 through metal frame substrate 12. Next, at step 108, the method provides an inert gas curtain around the deposition site at edge of cooling hole by directing a first shielding gas flow at tip portion. At step 110 the method optionally provides a second shielding gas flow at tip portion from bottom surface to prevent gases from contaminating the metal deposition site. Next, at step 112, force is applied to rotary electrode 30 to press the electrode tip portion 32 into contact with substrate 12 in cooling hole 10. Then, at step 114, ESD electrode is energized to generate an electrospark between rotary ESD electrode and top surface at cooling hole edge at sufficiently high temperature to melt edge and form a rounded edge and deposit a coating of electrode material alloy at cooling hole edge.

It should be understood that the application is not limited to the details or methodology set forth in the following description or illustrated in the figures. It should also be understood that the phraseology and terminology employed herein is for the purpose of description only and should not be regarded as limiting.

It is important to note that the construction and arrangement of the ESD system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A method for providing a coating comprising:
   providing a substrate having a first surface and at least one cooling hole formed in the first surface;
   providing a portable coating device including:
      electro-spark deposition (ESD) equipment, and
      an ESD torch electrically connected with the ESD equipment, the ESD torch including:
      an inert gas source; and
      a rotary electrode including a conductive material, the rotary electrode disposed within the ESD torch, the rotary electrode shielded by an inert gas, wherein rotary electrode applies a compositionally controlled protective coating to the first surface of the substrate;
   inserting the rotary electrode at least partially into the cooling hole;
   generating an electrospark between the rotary ESD electrode and the substrate to only form a rounded edge as a result of deformation of material from the substrate at an edge of the cooling hole and deposit a coating of electrode material alloy having a thickness of 3 mils or less over the rounded edge.

2. The method of claim 1, further comprising pressing the rotary electrode into contact with the substrate in the at least one cooling hole.

3. The method of claim 1, wherein the step of inserting the rotary electrode further comprises inserting a tip portion of the rotary electrode into the at least one cooling hole.

4. The method of claim 3, further comprising providing a transition portion on the tip portion, the transition portion transitioning from a diameter of the rotary electrode larger than a diameter of the at least one cooling hole to a tip portion having a diameter less than the diameter of the at least one cooling hole to permit partial insertion of tip portion.

5. The method of claim 4, wherein the transition portion comprises a geometry for forming the cooling hole edge.

6. The method of claim 5, wherein the geometry is a rounded edge.

7. The method of claim 1, further comprising providing an inert gas curtain around a deposition site at the cooling hole edge by directing a first shielding gas flow at the rotary electrode.

8. The method of claim 1, further comprising providing a second shielding gas flow at the rotary electrode from a bottom surface of the substrate.

9. The method of claim 1, further comprising applying force to the rotary electrode to make contact with the substrate in the at least one cooling hole.

10. The method of claim 1, further comprising forming a metallurgical bond between the substrate and the alloyed coating on an exit edge of the at least one cooling hole.

* * * * *